United States Patent [19]
Nava

[11] Patent Number: 5,651,449
[45] Date of Patent: Jul. 29, 1997

[54] CONVEYOR DEVICE FOR THERMOSHRINKING FILM PACKAGING SYSTEMS

[76] Inventor: Vito Giovanni Nava, Via Piazzalunga, 30, 24015 - San Giovanni Bianco (Bergamo), Italy

[21] Appl. No.: 531,667

[22] Filed: Sep. 21, 1995

[30] Foreign Application Priority Data

Jul. 7, 1995 [IT] Italy ................. MI950485 U

[51] Int. Cl.⁶ ......................................... B65G 15/54
[52] U.S. Cl. ............................................. 198/848; 198/952
[58] Field of Search ........................... 198/778, 817, 198/848, 952

[56] References Cited

U.S. PATENT DOCUMENTS

| | | | |
|---|---|---|---|
| 4,089,408 | 5/1978 | Vanderhoof | 198/848 |
| 5,285,891 | 2/1994 | Keip | 198/817 |
| 5,363,952 | 11/1994 | Miller, Jr. et al. | 198/848 |
| 5,462,154 | 10/1995 | Matsushima et al. | 198/952 X |

FOREIGN PATENT DOCUMENTS 2612468  10/1977  Germany ................. 198/952

*Primary Examiner*—James R. Bidwell
*Attorney, Agent, or Firm*—Bucknam and Archer

[57] ABSTRACT

A conveyor device comprises at least two training chains, which adjoin and support a plurality of rod-like elements, arranged between the chains and transversely of the driving direction, so as to define a supporting surface for the articles to be conveyed, the rod-like elements being spaced from one another and made of thermally insulating material.

4 Claims, 5 Drawing Sheets

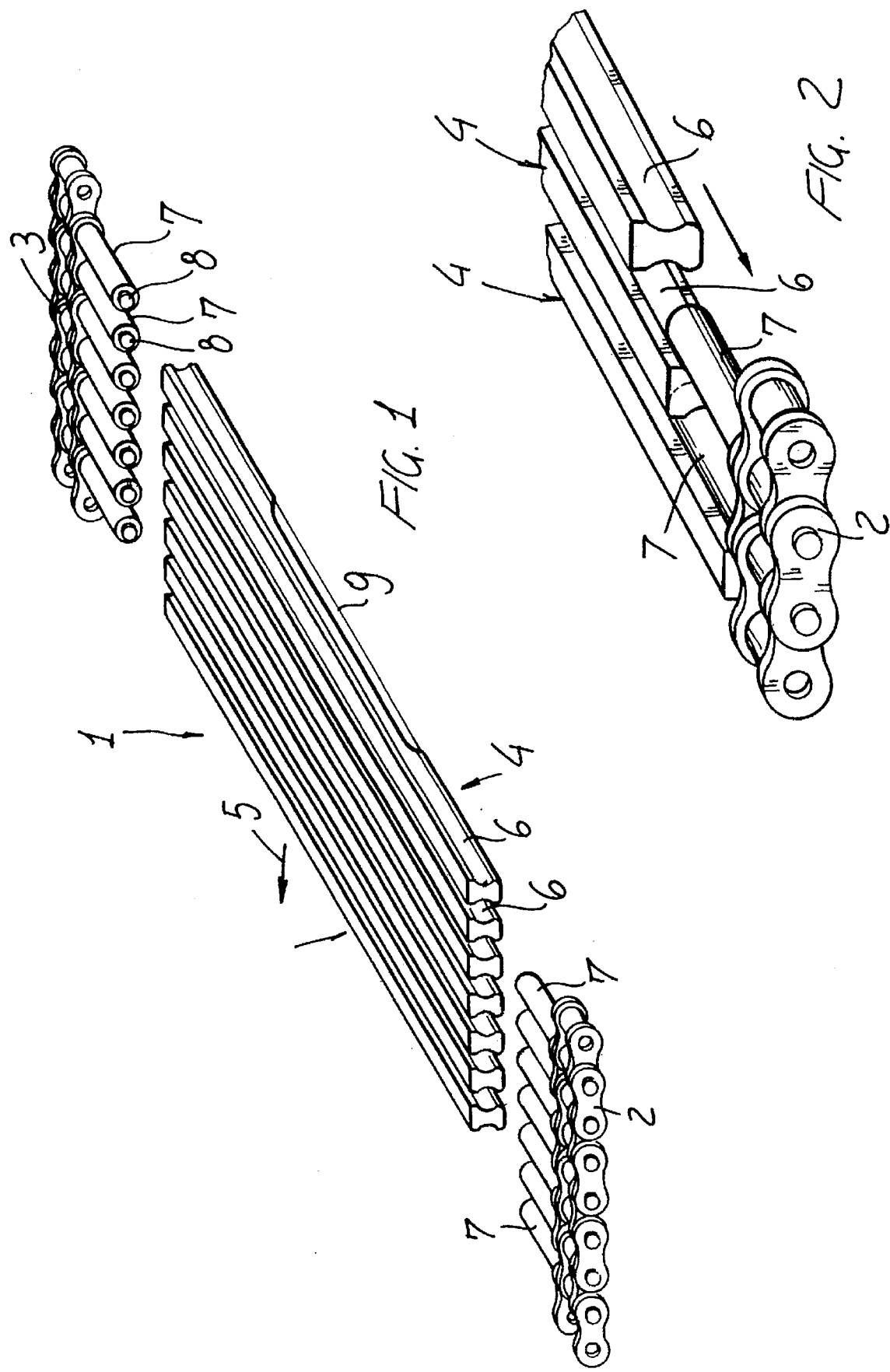

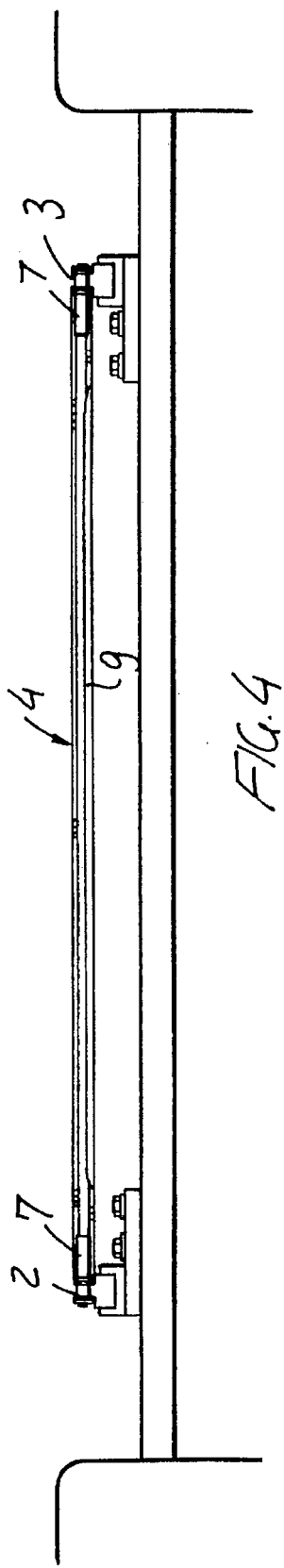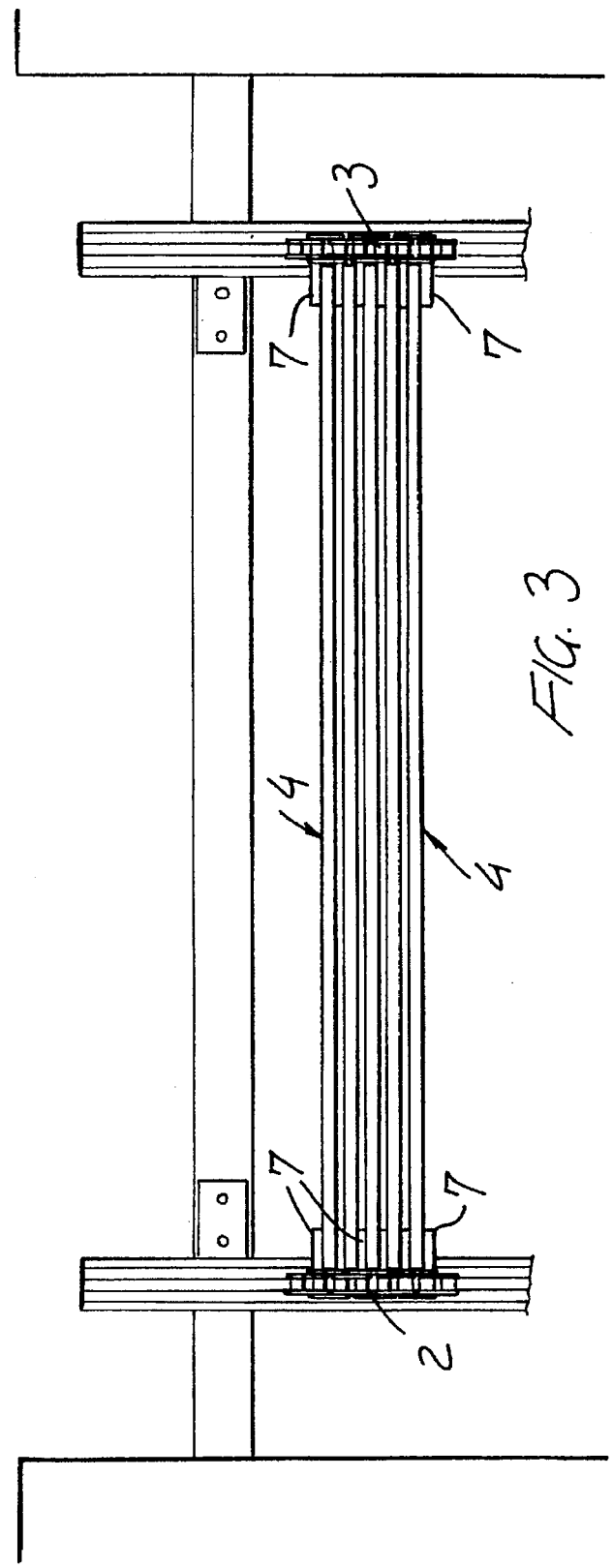

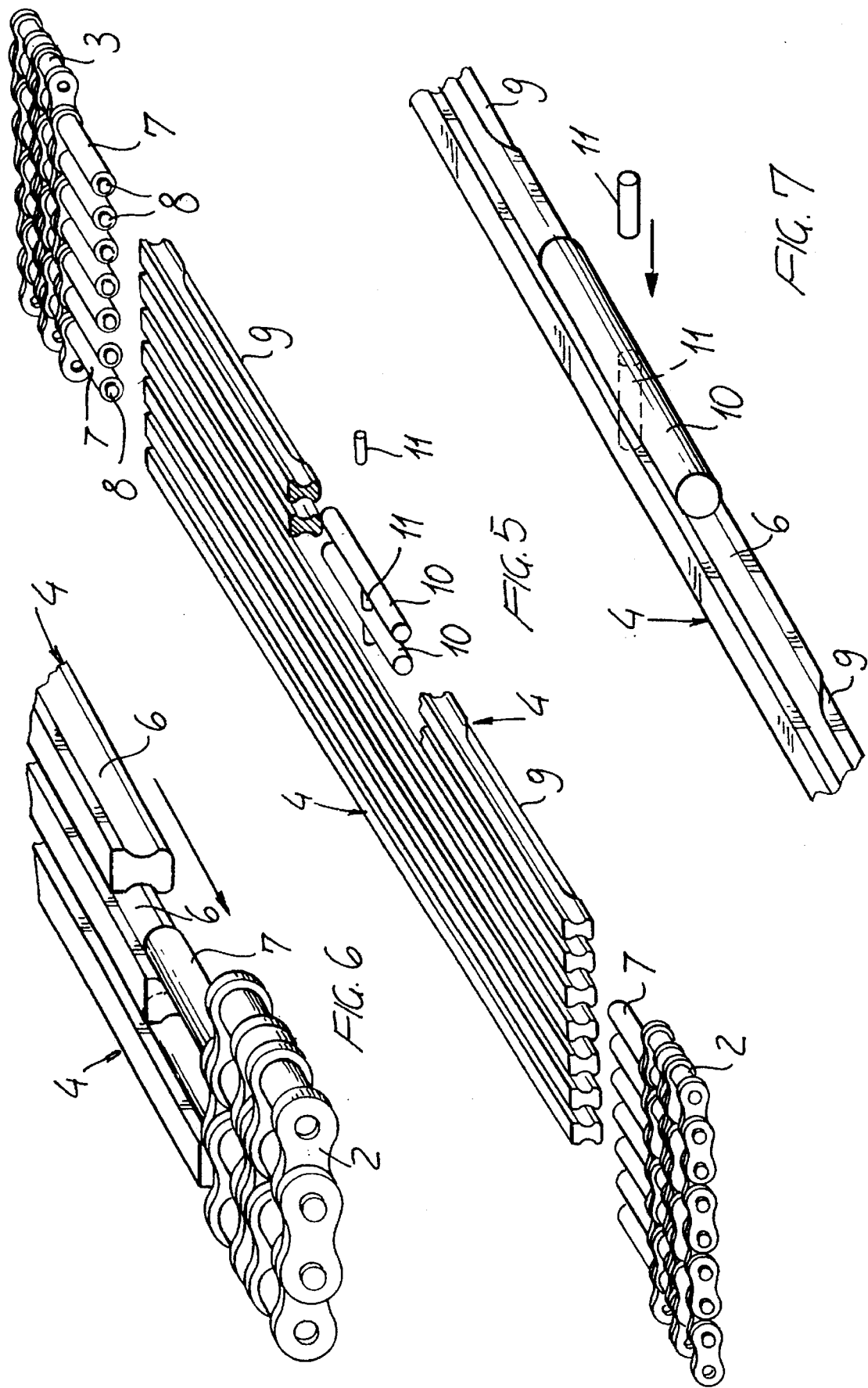

CONVEYOR DEVICE FOR THERMOSHRINKING FILM PACKAGING SYSTEMS

BACKGROUND OF THE INVENTION

The present invention relates to a conveyor device, which has been specifically designed for thermoshrinking film packaging systems.

As is known, in packaging articles by thermoshrinking film materials, there are conventionally used suitable tunnels, therethrough the articles to be packaged, preliminarily wound in the thermoshrinking material film, are conveyed by conveyor belts.

During their displacement inside the tunnel, the packaged articles are subjected to a hot air flow, which causes the thermoshrinking film to contract, thereby properly packaging the articles held therein.

Since the conveyor belts which are at present used in such an application are conventionally made of a metal material, the conveyor belt is quickly heated as it is driven through the heating tunnel, and is correspondingly quickly cooled in its return path as the conveyor belt exits the tunnel.

Thus, a great heat loss is generated, causing an inefficient and excessive power loss negatively affecting the operating cost of the system.

Moreover, because of the above mentioned quick heating and cooling operations, the conveyor belt can be disadvantageously deformed with consequent operation malfunctions.

SUMMARY OF THE INVENTION

Accordingly, the aim of the present invention is to solve the above mentioned problems, by providing a conveyor device, specifically designed for thermoshrinking film packaging systems, which is very reliable in operation.

Within the scope of the above mentioned aim, a main object of the present invention is to provide such a conveyor device which is not negatively affected from the operation temperatures of a thermoshrinking material packaging tunnel.

Another object of the present invention is to provide such a conveyor device which is specifically designed for greatly reducing the power loss deriving from the cooling outside of the heating tunnel, so as to greatly reduce the overall operation costs of the system.

According to one aspect of the present invention, the above mentioned aim and objects, as well as yet other objects, which will become more apparent hereinafter, are achieved by a conveyor device, specifically designed for thermoshrinking material packaging systems, characterized in that said conveyor device comprises at least two driving chains, adjoining one another and supporting a plurality of rod-like elements, arranged between said chains and oriented transversely of a driving direction, so as to define a supporting surface for a plurality of articles to be conveyed, said rod-like elements being spaced from one another and made of a thermally insulating material.

BRIEF DESCRIPTION OF THE DRAWINGS

Further characteristics and advantages of the conveyor device according to the present invention, will become more apparent hereinafter from the following detailed disclosure of a preferred embodiment of said conveyor device, which is illustrated, by way of a merely, but not limitative example, in the figures of the accompanying drawings, where:

FIG. 1 schematically illustrates, by an exploded perspective view, a portion of the conveyor device according to the present invention;

FIG. 2 illustrates, on an enlarged scale, a detail of FIG. 1;

FIG. 3 is a top plan view illustrating a portion of the conveyor device according to the invention;

FIG. 4 is a schematic front elevation view illustrating a portion of the device according to the invention;

FIG. 5 is an exploded perspective view illustrating another conveyor device according to the present invention;

FIG. 6 illustrates, on an enlarged scale, a detail of FIG. 5;

FIG. 7 illustrates a further enlarged detail of the conveyor device shown in FIG. 5;

BRIEF DESCRIPTION OF THE PREFERRED EMBODIMENTS

Figure 8:
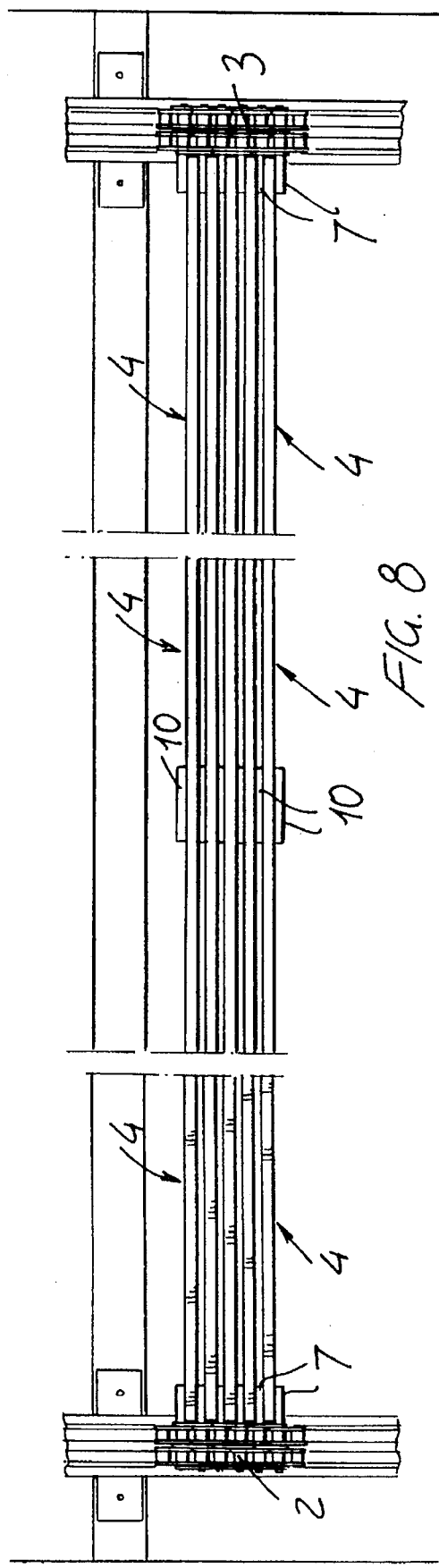
FIG. 8 is a top plan view illustrating the conveyor device of FIG. 5.

With reference to FIGS. 1 to 4 of the accompanying drawings, the conveyor device according to the invention, which has been generally indicated by the reference number 1, comprises at least two driving chains 2 and 3, which adjoin one another and are driven, in a per se known manner, along a driving direction 5, for example by means of pinions in turn driven by any known types of motor-reducing unit, which has not been shown for simplicity purposes.

As shown, the driving chains 2 and 3 support a plurality of rod-like elements 4, which are arranged between said driving chains 2 and 3, and are oriented transversely of the driving direction 5, so as to define a supporting surface for supporting the articles to be conveyed.

The rod-like elements 4 are spaced from one another and made of a thermally insulating material, preferably a glass-resin thermoinsulating material.

More specifically, the rod-like elements 4 are provided, at least at their longitudinal end portions, on the sides thereof, with hollow seats 6 in which are engaged supporting bushings 7 in turn threaded on the coupling pins 8 of the driving chains 2 and 3. The coupling pins 8, in particular, laterally project from the sides of the driving chains 2 and 3, which are mutually facing one another.

Thus, the longitudinal end portions of the mentioned rod-like elements 4 are engaged, owing to their specifically designed configuration, with the hollow seats 6, between two adjoining supporting bushings 7.

This connection, in addition to assuring a good mechanical strength to the conveyor device, will practically hold unchanged the articulation provided between the links of the driving chains 2 and 3, so as not to hinder the driving movement thereof.

The rod-like elements 4 are moreover provided, at the bottom thereof, with side cut-outs 9, facilitating the passage of air through the supporting surface defined by the plurality of rod-like elements 4.

As the rod-like elements 4 have a comparatively high length, it is possible to provide, as is clearly shown in FIGS. 5 to 8, at a middle region of said rod-like elements, a connection or coupling arrangement between the several rod-like elements, including connecting pins 10 which are engaged with a parallel relationship between two adjoining rod-like elements 4, at the hollow seats 6, and which are coupled to said rod-like elements 4 by pegs 11.

Figure 9:
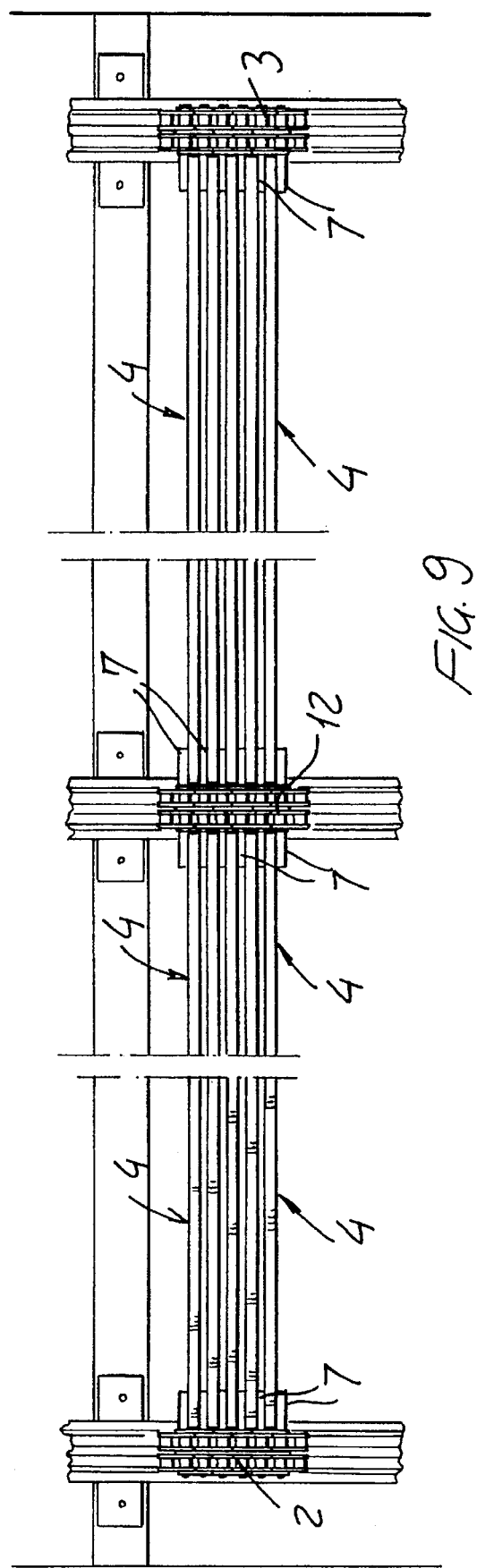
FIG. 9 is a further top plan view illustrating a further conveyor device according to the present invention.
Figure 10:
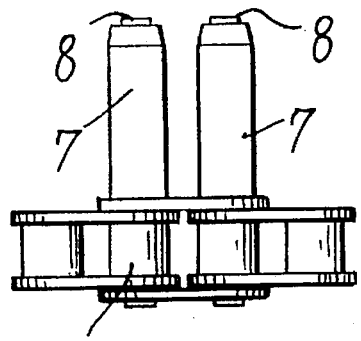
FIG. 10 is a top plan view illustrating a portion of one of the driving chains included in the conveyor device shown in FIGS. 1 to 4.
Figure 11:
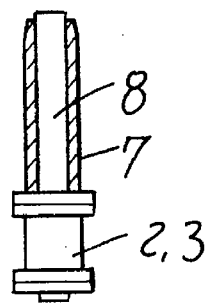
FIG. 11 is a cross-sectional view illustrating a link of the chain shown in FIG. 10.
Figure 12:
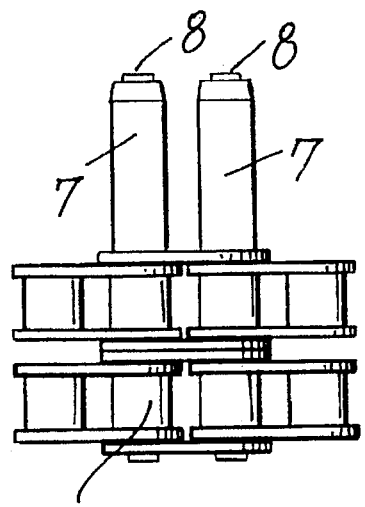
FIG. 12 is a top plan view illustrating a portion of one of the driving chain of the conveyor devices shown in FIGS. 5 to 9.
Figure 13:
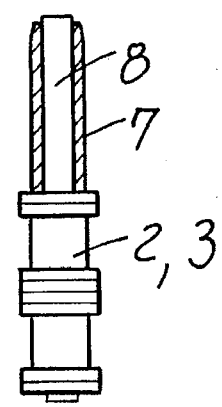
FIG. 13 is a cross-sectional view illustrating a link of the chain shown in FIG. 12.
Figure 14:
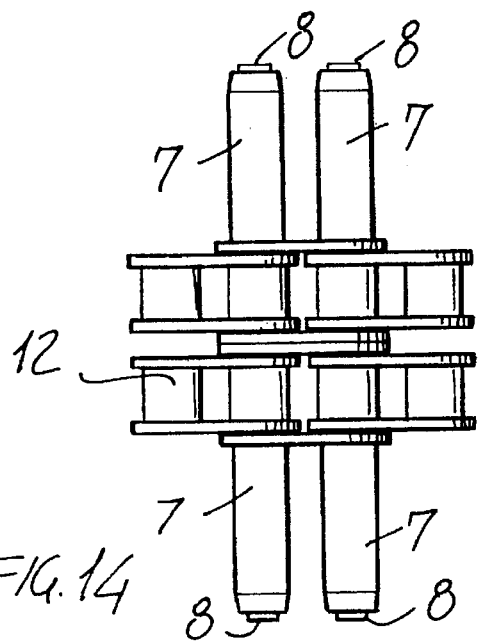
FIG. 14 is a top plan view illustrating a portion of the middle driving chain of the conveyor device shown in FIG. 9.
Figure 15:
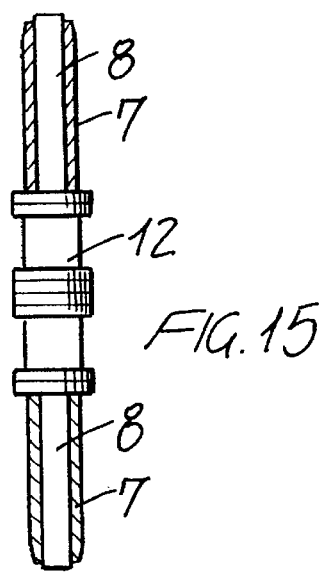
FIG. 15 is a further cross-sectional view illustrating a link of the chain shown in FIG. 14.

If the conveyor device has a comparatively high width, then it is possible to provide three or more driving chains, indicated by the reference numbers 2, 3 and 12, which are mutually adjoining and include a plurality of the rod-like elements 4, of the above disclosed type, extending transversely of the driving direction between the chains 3 and 12 and the chains 12 and 2, as is clearly shown in FIG. 9.

Even in this case, the coupling of the rod-like elements 4 and chains 2, 3 and 12 is made by providing the rod-like elements 4 with the above disclosed specifically designed configuration and also providing the supporting bushes elements 7 threaded or engaged on the articulation pins 8 of the links of the chains.

The driving chains 2, 3 and 12 can be of a simple link type, as shown in FIGS. 1 to 4, or they can include double-links, as is shown in FIGS. 5 to 9.

Since the supporting surface of the article to be conveyed is constituted by a plurality of rod-like elements 4, which are spaced from one another and are provided with side bottom cut-outs 9, facilitating the passage of air through said supporting surface, the conveyor device according to the present invention can be efficiently used inside heating tunnels for thermoshrinking material packaging systems.

Since the rod-like elements 4 are made of a glass-resin material, the thermal losses will be greatly reduced with a consequent reduction of the operation costs of the system.

From the above disclosure and from an observation of the figures of the accompanying drawings, the great functionality and operation reliability of the conveyor device according to the present invention will be self-evident.

In particular, the fact is to be pointed out that a conveyor device has been provided, specifically designed for thermoshrinking material packaging systems, which is practically unalterable and greatly reduces the thermal losses occurring in the heating operation cycle as necessary for the thermoshrinking material packaging method, thereby greatly reducing the operating costs of the overall system.

In practicing the invention, the used materials, provided that they are compatible to the intended use, as well as the contingent size and shapes, can be any, depending on requirements.

I claim:

1. A conveyor device, specifically designed for thermoshrinking material packaging systems, comprising at least two driving chains, adjoining one another and supporting a plurality of rod-like elements, arranged between said chains and oriented transversely of a driving direction, so as to define a supporting surface for a plurality of articles to be conveyed, said rod-like elements being spaced from one another and made of a thermally insulating material, wherein said conveyor device comprises three driving chains adjoining one another and supporting a plurality of rod-like elements, arranged between said driving chains and oriented transversely of said driving direction.

2. A conveyor device according to claim 1, wherein said rod-like elements are made of a glass-resin material.

3. A conveyor device according to claim 1, wherein said rod-like elements have end portions thereof arranged between supporting bushing means arranged on pin means coupling link means of said driving chains, and laterally projecting from said driving claims, said rod-like elements being moreover provided at least near their longitudinal end portions, with sides in which are formed hollow seats for said supporting bushing means, as well as with bottom side cut-outs for allowing air to pass through said supporting surface defined by said plurality of rod-like elements.

4. A conveyor device according to claim 1, wherein said rod-like elements are coupled at a middle region thereof by coupling pins arranged between said rod-like elements, said coupling pins extending parallel to said rod-like elements and being fixed to said rod-like elements.

\* \* \* \* \*